US006973037B1

(12) United States Patent
Kahveci

(10) Patent No.: US 6,973,037 B1
(45) Date of Patent: Dec. 6, 2005

(54) SYSTEM AND METHOD FOR DYNAMICALLY VARYING INTEGRATED SERVICES DIGITAL NETWORK (ISDN) INTERFACE BANDWIDTH

(75) Inventor: Tunc Mustafa Kahveci, Morrisville, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/564,971

(22) Filed: May 4, 2000

(51) Int. Cl.$^7$ .............................................. H04L 12/26
(52) U.S. Cl. .................................. 370/236; 370/468
(58) Field of Search .............................. 370/235, 236, 370/395.2, 395.21, 465, 468, 522, 524, 395.4, 370/395.41, 595.42, 595.43

(56) References Cited

U.S. PATENT DOCUMENTS

| | | | | |
|---|---|---|---|---|
| 4,704,716 A | * | 11/1987 | Bowers et al. ............... | 370/371 |
| 4,821,264 A | * | 4/1989 | Kim .......................... | 370/434 |
| 5,231,631 A | * | 7/1993 | Buhrke et al. ............... | 370/230 |
| 5,463,629 A | * | 10/1995 | Ko ............................. | 370/463 |
| 5,574,861 A | * | 11/1996 | Lorvig et al. ............... | 709/226 |
| 5,751,712 A | * | 5/1998 | Farwell et al. .............. | 370/431 |
| 5,938,735 A | * | 8/1999 | Malik ......................... | 709/238 |
| 5,959,998 A | * | 9/1999 | Takahashi et al. .......... | 370/431 |
| 6,047,006 A | * | 4/2000 | Brakefield et al. .......... | 370/524 |
| 6,134,222 A | * | 10/2000 | Rogers et al. .............. | 370/264 |
| 6,160,808 A | * | 12/2000 | Maurya ...................... | 370/389 |
| 6,208,640 B1 | * | 3/2001 | Spell et al. ................. | 370/358 |
| 6,215,796 B1 | * | 4/2001 | Smith, Jr. ................... | 370/493 |
| 6,307,836 B1 | * | 10/2001 | Jones et al. ................. | 370/230 |
| 6,377,554 B1 | * | 4/2002 | Farnsworth et al. ........ | 370/252 |
| 6,396,816 B1 | * | 5/2002 | Astle et al. ................. | 370/264 |
| 6,493,336 B1 | * | 12/2002 | Perry et al. ................. | 370/352 |
| 6,496,504 B1 | * | 12/2002 | Malik ......................... | 370/390 |
| 6,618,400 B1 | * | 9/2003 | Okamura ................... | 370/524 |

* cited by examiner

*Primary Examiner*—Kwang Bin Yao
(74) *Attorney, Agent, or Firm*—Withrow & Terranova, PLLC

(57) ABSTRACT

A method for dynamically varying bandwidth of a primary rate ISDN interface includes requesting, over a data (D) channel, allocation of at least one first B channel of the primary rate ISDN interface. When notification of allocation of the first B channel is received, over the D channel, data is sent over the first B channel. A relationship is monitored between a first bandwidth demand parameter and first and second threshold values. If a predetermined relationship exists between the first bandwidth demand parameter and the first threshold value, allocation of at least one second B channel of the primary rate ISDN interface is requested. In response to receiving notification of allocation of the second channel, data is sent over the second B channel. The second B channel is released in response to a relationship between the first bandwidth demand parameter and a second threshold. A hyper primary rate ISDN interface (HPRI) defines a virtual primary rate interface (PRI) that does not include a predetermined number of B channels. A bandwidth user can statically request any number of the available bearer channels. Alternatively, B channels can be dynamically allocated or de-allocated based on demand.

37 Claims, 7 Drawing Sheets

SYSTEM AND METHOD FOR DYNAMICALLY VARYING INTEGRATED SERVICES DIGITAL NETWORK (ISDN) INTERFACE BANDWIDTH

TECHNICAL FIELD

This invention relates generally to an ISDN interface and more particularly to a variable bandwidth primary rate ISDN interface.

BACKGROUND ART

The existing public switched telephone network (PSTN) was intended to carry voice transmissions, i.e., people talking to other people, over standard, twisted pair copper phone lines. The integrated services digital network (ISDN) uses the same copper phone lines. The "integrated" portion of ISDN, however, refers to the combination of voice and data services over the same wires (that is, it is possible for computers to connect directly to the PSTN without having to convert signals to analog audio signals). Because ISDN uses the existing local telephone wiring, ISDN is available to home and business customers.

In the integrated services digital network, there are two levels of service, namely basic rate interface (BRI) and primary rate interface (PRI). Both BRI and PRI include a number of B channels (B for bearer) and a D channel (D for data).

The D channel is used to exchange signaling information between the telephone company's central office (CO) and ISDN equipment, for example, between a CO and a private branch exchange (PBX), such as a multiple line office telephone network. The B channel carries voice or data signals. Each B channel can carry a separate telephone call and is typically identified by a separate telephone number.

PRI consists of twenty-three B channels and one D channel on a T1 line, or 23B+D, and thirty B channels and one D channel on an E1 line, or 30B+D. Each channel can carry 64 kilobits per second (kbps). Thus, a PRI user can have up to 1.544 Mbps service on a T1 line, or up to 2.048 Mbps service on an E1 line. PRI uses the Q.931 protocol to send call signaling messages over the D channel.

PRI channels are carried by T1 lines in the United States, Canada, and Japan and by E1 lines in other countries. The twenty-three/thirty B channels that a customer is allocated can be used flexibly and reassigned if necessary to meet special needs when large amounts of data are sent and received, such as video conferences or downloading large files.

When a customer, such as a business, purchases a T1 line, the customer is allocated all twenty three bearer channels of the T1 line and the data channel of the T1 line. At any given time, the customer can only be using some of the channels on the T1 line, while other channels remain idle. However, the customer is required to pay for the bandwidth for the entire T1 line, which is currently about $2,000 per month. In addition, if a customer's bandwidth needs extend beyond those of a single T1 line, the customer must purchase another fixed unit of bandwidth, such as another T1 line. Thus, under the current scheme, ISDN bandwidth cannot be allocated dynamically to customers.

In order to maintain quality of service (QoS) a customer must purchase a predetermined number of B channels to meet anticipated demand. Moreover, the CO must also have switching circuits available to accommodate the customer's fixed bandwidth whether or not the circuits are used. However, as indicated above, T1/E1 lines are not inexpensive and multiple lines can result in excessive cost to the customer who only occasionally needs a large bandwidth.

Quality of service includes many different measurements used to determine the quality of a given network connection. For example, quality of service can be the end-to-end delay between endpoints, the bit rate, the unused bit rate, etc. Various schemes for managing quality of service have been implemented in upper layer protocols, i.e., layer 2 and above. For example, in the TCP/IP protocol stack, it is known to provide quality of service management functions at the IP layer (layer 3), and at the transport layer (layer 4). Similarly, in the ATM protocol stack, it is known to provide quality of service management functions at the ATM layer (layer 2). While these techniques effectively manage quality of service at higher levels, the quality of service of a given connection is ultimately limited by the bandwidth provided by the physical layer (layer 1). Therefore, what is needed is a method for dynamically allocating bandwidth at the physical layer.

One technology known as BONDING (Bandwidth ON Demand Interoperability) used with BRI combines two telephone lines into a single channel, effectively doubling the data transfer speeds. However, to take advantage of channel BONDING, there must be two or more modems and two or more telephone lines already allocated to the user. In addition, BONDING is accomplished with respect to BRI, and not PRI. Accordingly, BONDING does not provide a method for dynamically allocating primary rate ISDN bandwidth.

SUMMARY OF THE INVENTION

This invention results from the realization that a truly effective and efficient primary rate ISDN interface is accomplished by dynamically allocating and deallocating B channels to increase and decrease bandwidth as the demand varies by monitoring a bandwidth demand parameter and comparing it to a predetermined threshold value.

The invention features a method of dynamically varying the bandwidth of a primary rate integrated services digital network interface for transmitting data. The method includes sending data over a first channel, monitoring a relationship between a first bandwidth demand parameter and a first threshold and monitoring a relationship between the first bandwidth demand and a second threshold. At least one additional channel for transmitting data is allocated in response to a predetermined relationship between the first bandwidth demand parameter and the first threshold. The additional channel for transmitting data is released in response to a predetermined relationship between the second value and the second threshold.

The first bandwidth demand parameter can include the level of data stored in a queue and the first threshold can include a first predetermined level of data in the queue. The second threshold can include a second predetermined level of data in the queue. A second bandwidth demand parameter that can be monitored can include an amount of time that the additional channel has been allocated and the second threshold can include a predetermined amount of time. When the additional channel has been allocated for a predetermined amount of time, the channel can be released.

It is therefore an object of the present invention to provide a system and method for dynamically allocating bandwidth based on demand.

A hyper primary rate interface (HPRI) defines a virtual primary rate interface (PRI) that does not include a predetermined number of B channels. A bandwidth user can statically request any number of the available bearer channels. Alternatively, B channels can be dynamically allocated or de-allocated based on demand.

An object of the invention having been stated hereinabove, and which is achieved in whole or in part by the present invention, other objects will become evident as the description proceeds when taken in connection with the accompanying drawings as best described hereinbelow.

BRIEF DESCRIPTION OF THE DRAWINGS

Embodiments of the present invention will now be described with reference to the accompanying drawings of which.

DETAILED DESCRIPTION OF THE INVENTION

Traditional primary rate ISDN interfaces are defined by a provisioned or fixed allocation of B and D channels. The allocation of multiple channels has typically been cost prohibitive to home users and small businesses because the user must pay for the channels whether or not they are being used.

Operating Environment

Figure 1:
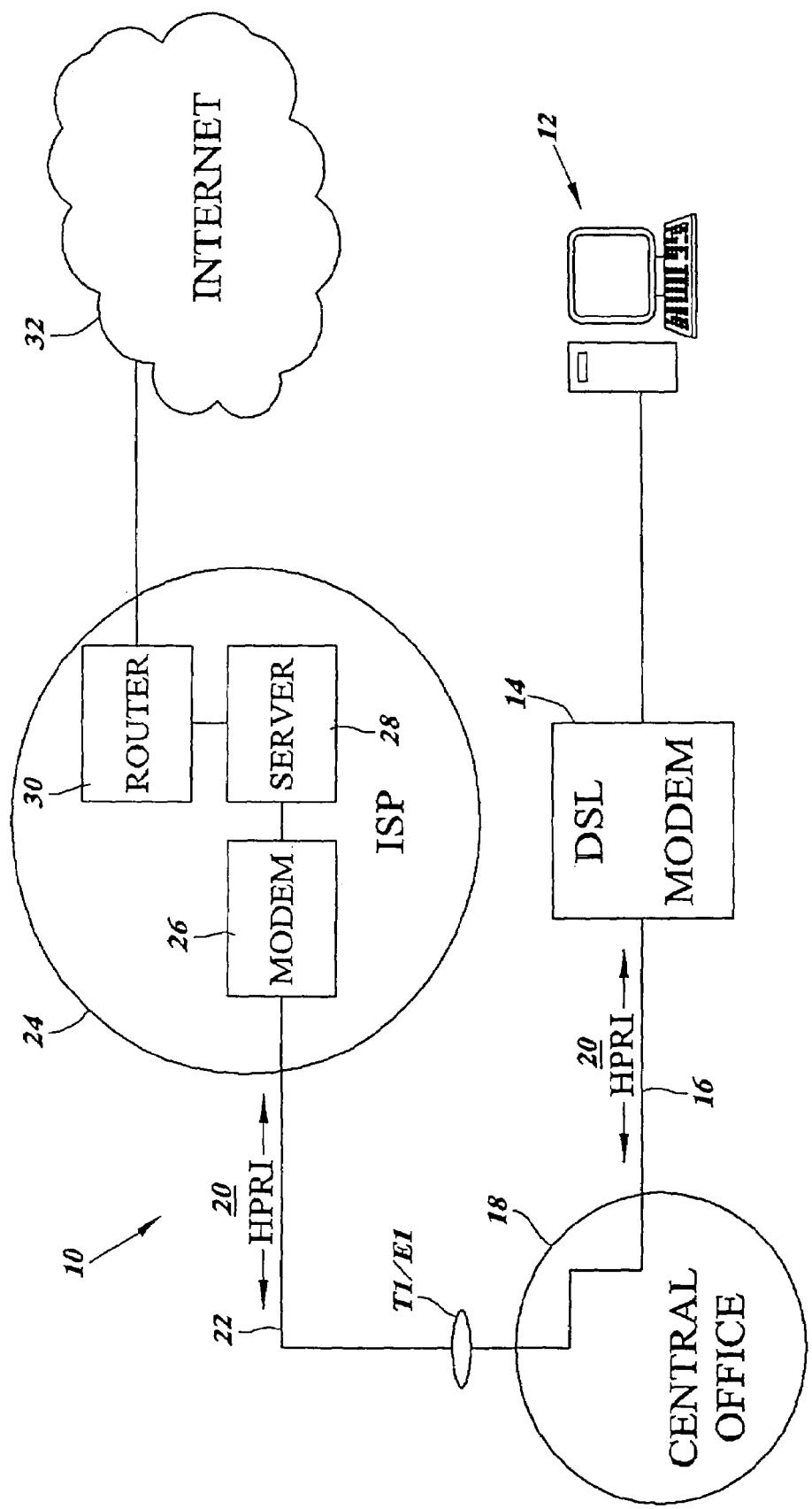
FIG. 1 is a block diagram representation of a primary rate integrated services digital network (ISDN) incorporating a hyper primary rate ISDN interface according to an embodiment of the present invention.

FIG. 1 illustrates one representation of a primary rate integrated services digital network according to an embodiment of the present invention generally designated 10. Network 10 includes a user generally designated 12 connected via a modem 14 and twisted pair 16 to a telephone company central office (CO) 18. User 12 can include a home user as well as a local area network (LAN) such as found in a business office, for example an Ethernet. Modem 14 can typically include a digital subscriber line (DSL) modem or the like that provides high speed data transmission over twisted pair 16, which might include traditional copper phone lines or optical fibers. A hyper primary rate interface (HPRI) 20 is provided between modem 14 and CO 18. HPRI 20 allows modem 14 to dynamically request additional ISDN bandwidth from central office 18 in response to bandwidth demand. HPRI 20 also allows modem 12 to dynamically release bandwidth obtained from central office 18. The mechanism for dynamically requesting and releasing ISDN bandwidth will be discussed in detail below.

CO 18 is connected via multiple T1/E1 lines 22, consisting of a number of B and D channels, to Internet service provider (ISP) 24. Additional HPRIs 20 are provided between T1/E1lines 22 and both CO 18 and ISP 24. ISP 24 typically includes a modem 26, a server 28 and a router 30 to provide access to Internet 32.

Host-Side Software

Figure 2:
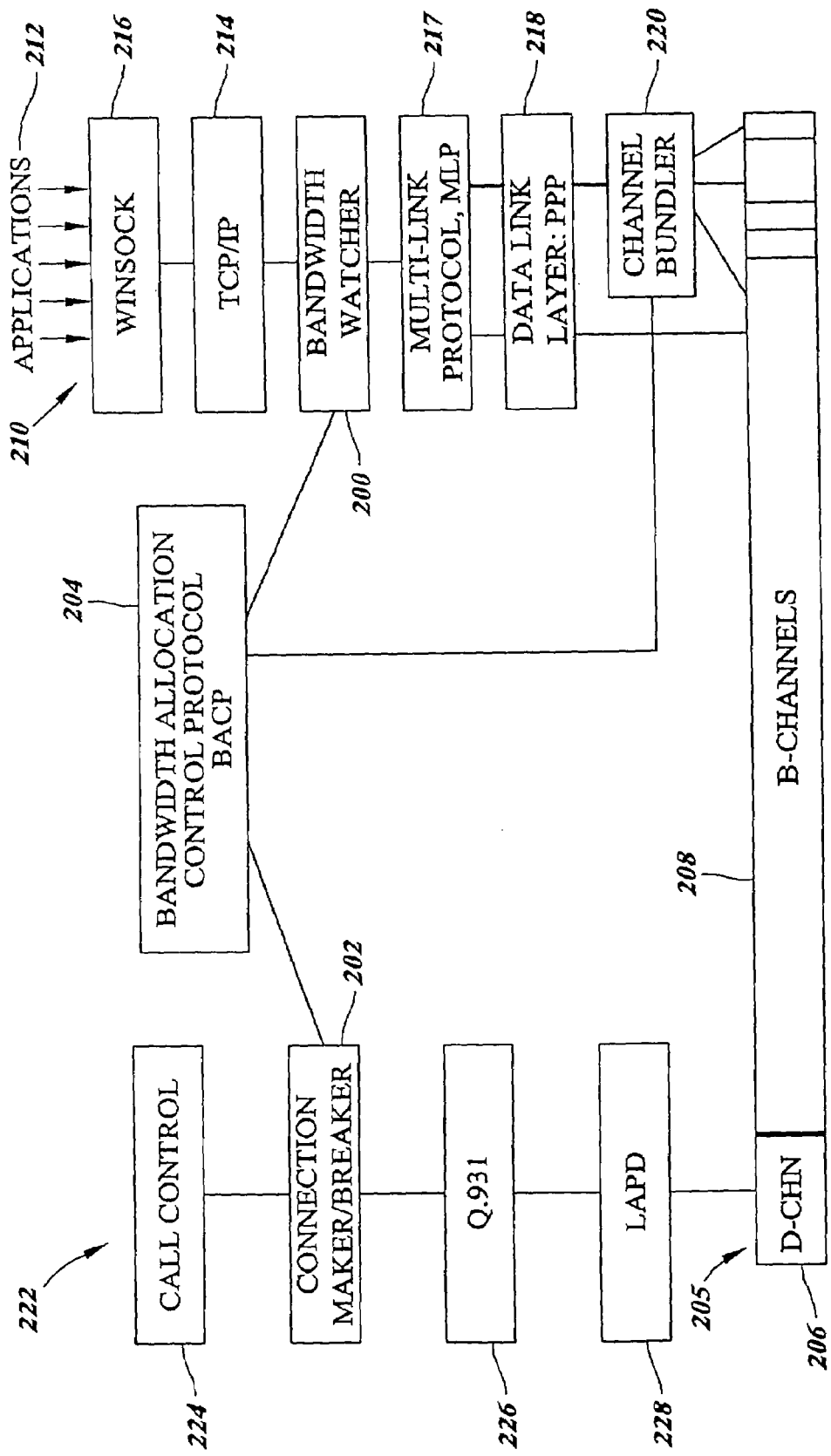
FIG. 2 is a schematic block diagram of exemplary host-side software for providing the hyper primary rate ISDN interface according to an embodiment of the present invention.

FIG. 2 illustrates exemplary host-side software for implementing a hyper primary rate ISDN interface according to an embodiment of the present invention. By host-side software, it is meant that the blocks or layers illustrated in FIG. 2 are implemented in devices that use bandwidth, such as modem 14, user 12, modem 26, and server 28 illustrated in FIG. 1. Host-side software or devices can be contrasted with central-office side software or devices, such as central office 18, which manages bandwidth requested by one or more hosts.

In FIG. 2, a bandwidth watcher 200 monitors bandwidth demand of a bandwidth user. For example, bandwidth watcher 200 can monitor send queues of a host computer at the network layer, the transport layer, the application layer, the datalink layer or the physical layer. Bandwidth watcher 200 communicates with connection maker/breaker 202 to dynamically request and release physical layer bandwidth in response to demand using bandwidth allocation control protocol (BACP) 204. Bandwidth allocation control protocol 204 provides novel messages for dynamically requesting and releasing bandwidth. Connection maker/breaker 202 sends bandwidth allocation control protocol messages over D channel 206 between a service recipient, such as an end user, and a service provider, such as a telephone end office.

Bandwidth watcher 200 and connection maker/breaker 202 cooperate to dynamically request and release B channels 208 in response to bandwidth demand. For example, if an end user requires one B channel initially and later needs two additional B channels, the additional B channels can be allocated dynamically without requiring the customer to purchase fixed blocks of bandwidth. When the customer's needs decrease, the B channels can be de-allocated using the bandwidth allocation control protocol, thus freeing up bandwidth for other users. As a result, end offices can be designed more efficiently. The mechanisms for monitoring bandwidth and for allocating additional bandwidth will be discussed in more detail below.

The remaining blocks illustrated in FIG. 2 illustrate conventional call control and Internet protocol software and are included for completeness. For example, protocol stack generally designated 210 includes protocol software through which applications 212 communicate with applications executing on other physical machines. For example, applications 212 access TCP/IP protocol software 214 using an application programming interface 216. In the illustrated embodiment, the application programming interface is the Winsock interface. In an alternative embodiment, the application programming interface could be the Berkley sockets interface. As stated above, bandwidth watcher 200 monitors bandwidth demand at one or more layers of protocol stack 210 to determine whether additional physical layer bandwidth is needed. Multi-link protocol software 217 controls segmentation and reassembly of packets between end users. Data link layer software layer 218 handles communications between physical machines. For example, data link layer software 218 can include Ethernet software. Channel bundler 220 inserts data into time slots in B channels 208 to increase bandwidth by bonding multiple channels.

Protocol stack generally designated 222 performs conventional call control signaling. For example, call control block 224 can include an application layer call control such as the session initiation protocol (SIP). As stated above, connection maker/breaker 202 requests and releases additional B channels in response to bandwidth demand. Q.931 block 226 includes functionality for call setup and call teardown between end users. LAPD block 228 provides datalink layer services for D channel communications.

Applications 212, Winsock interface 216, and TCP/IP module 214 are typical protocol stack functions implemented on a host computer. The remaining blocks illustrated in FIG. 2 that comprise a hyper primary rate interface (HPRI) according to embodiments of the present invention may be implemented in or on a host computer, or on a hardware module located external to the host computer.

Figure 3:
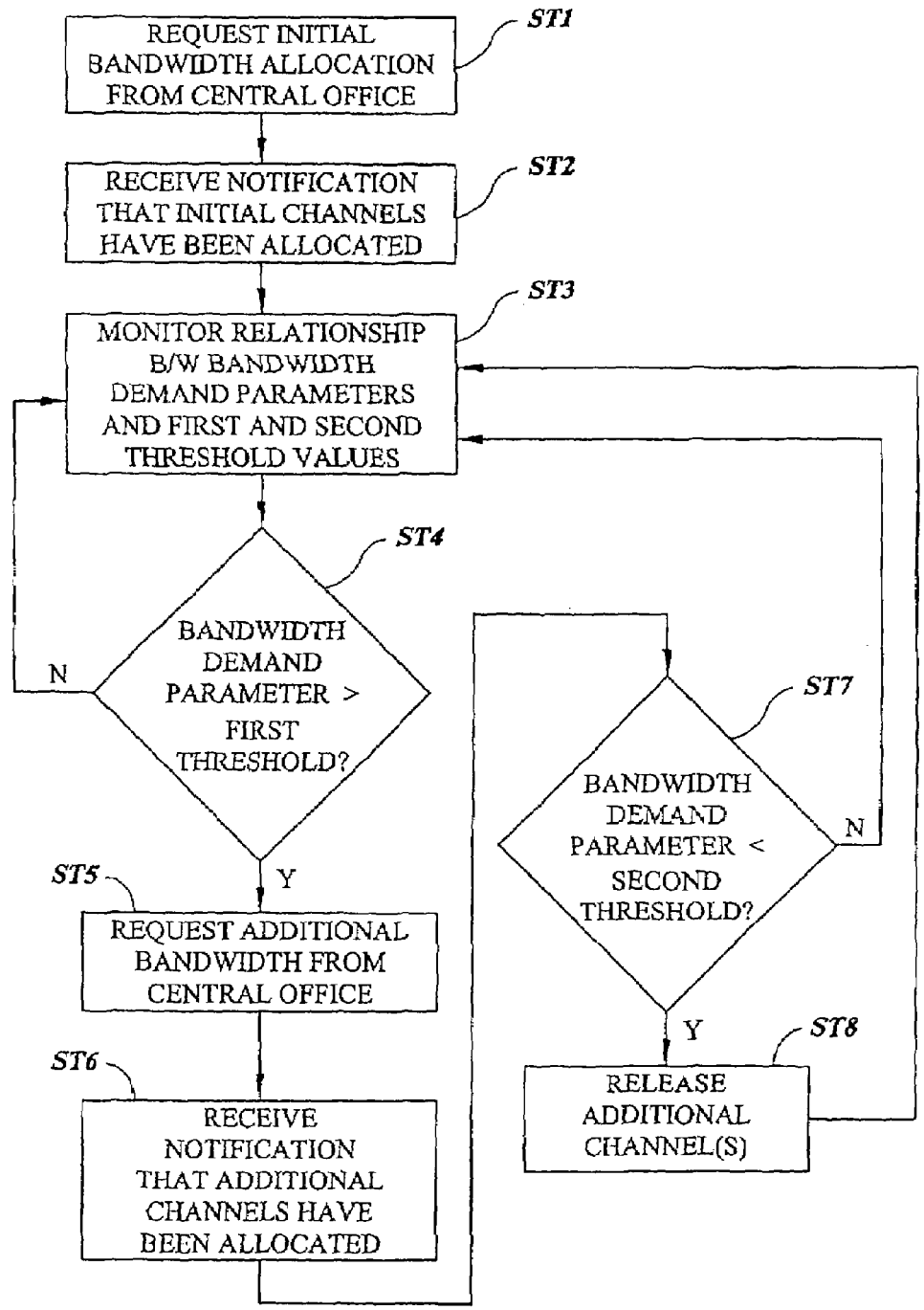
FIG. 3 is a flow chart illustrating exemplary steps that can be performed by a bandwidth watcher and a connection maker/breaker in requesting additional ISDN bandwidth according to an embodiment of the present invention.

FIG. 3 is a flow chart illustrating exemplary steps that can be performed by bandwidth watcher 200 and connection maker/breaker 202 illustrated in FIG. 2 to dynamically request B channels in response to bandwidth demand. In FIG. 3, it is assumed that a D channel is open between the host or user-side device and the central office to allow communication of bandwidth allocation control protocol messages. Referring to FIG. 3, in step ST1, connection maker/breaker 202 requests an initial bandwidth allocation. The initial bandwidth allocation request can be communicated from the host to the central office in a bandwidth allocation control protocol message transmittal over the D channel. Assuming that the central office has B channels available, the central office notifies the host that additional channels are available and provides the host with information, such as the TDM time slot for using the B channels. Accordingly, in step ST2, bandwidth watcher receives notification of the initial bandwidth allocation.

In step ST3, bandwidth watcher 200 monitors a relationship between a bandwidth demand parameter and first and second threshold values. In this example, it is assumed that the bandwidth demand parameter is the level of data in a send queue associated with a sending application. The first threshold value can be a first level of data in the send queue that indicates that additional bandwidth is needed. The second threshold can be a second level of data in the send queue lower than the first level that prompts the release of additional bandwidth. Having two thresholds provides a hysteresis and reduces the likelihood of oscillation between allocation and de-allocation of additional bandwidth.

In step ST4, bandwidth watcher 200 determines whether the bandwidth demand parameter is greater than the first threshold. If the bandwidth demand parameter is not greater than the first threshold, bandwidth watcher 200 continues monitoring the bandwidth demand parameter. If, on the other hand, the bandwidth demand parameter exceeds the first threshold, in step ST5, bandwidth watcher 200 instructs connection maker/breaker 202 to request at least one additional B channel from the central office switch. In this step, the number of additional B channels requested depends on the bandwidth demand. Because embodiments of the present invention do not require allocation of fixed blocks of B channels, such as 23 B channels in the conventional PRI case, any number of additional B channels can be requested. In step ST6, provided that the additional channels are available, bandwidth watcher 200 receives notification that additional bandwidth bas been allocated. The notification preferably identifies the additional channels and provides information sufficient for the host to use the additional channels.

In step ST7, bandwidth watcher 200 determines whether the bandwidth demand parameter is below the second threshold. As stated above, the second threshold is a de-allocation value which is lower than the first threshold. If bandwidth watcher 200 determines that the bandwidth demand parameter is not less than the second threshold, bandwidth watcher 200 continues to monitor the relationship between the bandwidth demand parameter and the threshold values. If bandwidth watcher 200 determines that the bandwidth demand parameter is below the second threshold, in step ST7, bandwidth watcher instructs connection maker/breaker 202 to release the additional channel. Thus, the flow chart in FIG. 3 illustrates steps that can be performed to dynamically request and release additional B channels in response to bandwidth demand. The bandwidth demand is determined in this example by the level of data in a send queue.

Figure 4:
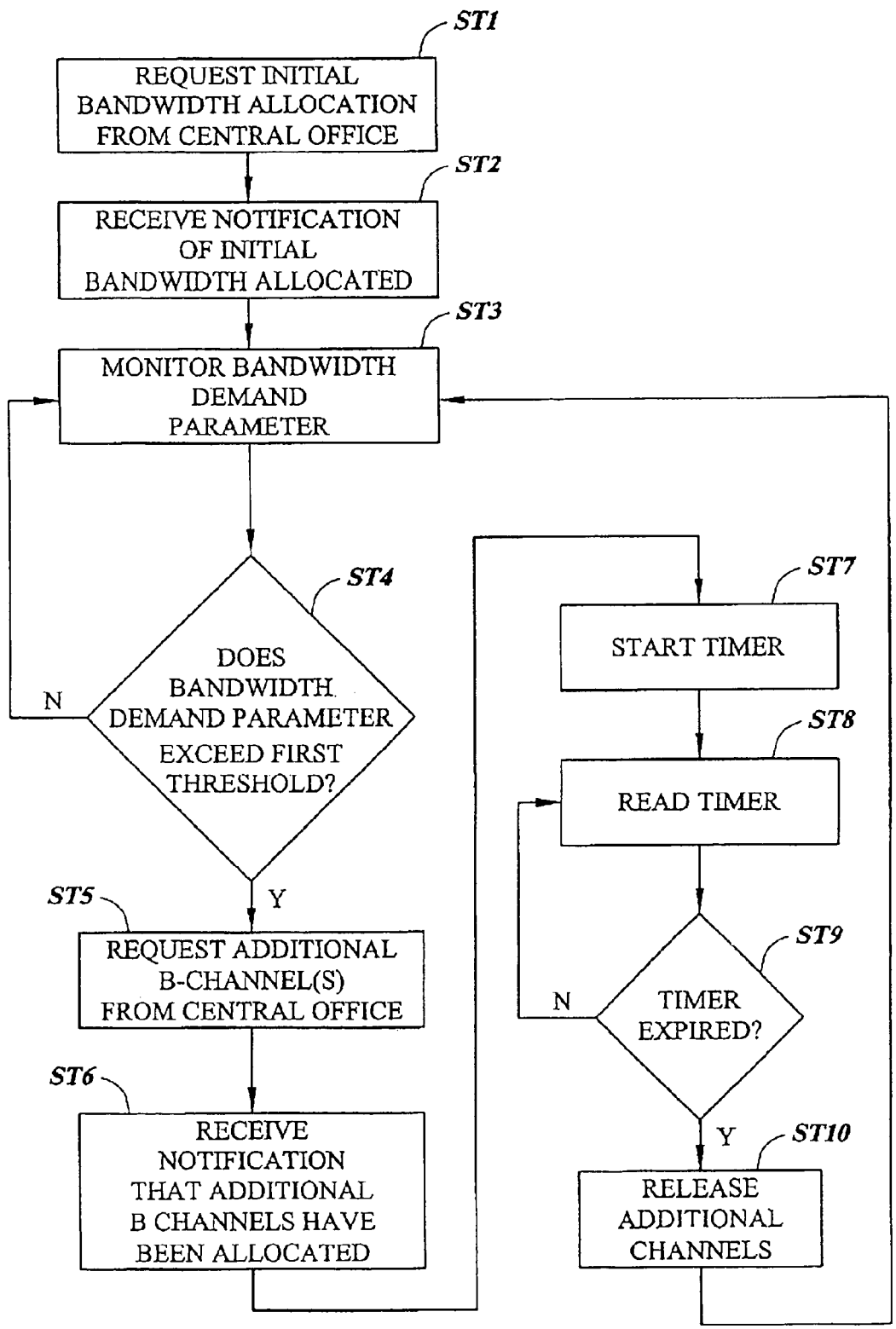
FIG. 4 is a flow chart illustrating exemplary steps that can be performed by a bandwidth watcher and a connection maker/breaker in requesting additional ISDN bandwidth according to another embodiment of the present invention.

While FIG. 3 illustrates steps required for dynamic bandwidth control based on send queue data levels, FIG. 4 illustrates exemplary steps that can be performed by bandwidth watcher 200 and connection maker/breaker 202 to dynamically request and release additional B channels based on a single send queue data level and a timer. In FIG. 4, it is assumed that at least one D channel is open between the end user device and the central office switch to allow exchange of bandwidth allocation control protocol messages. Referring to FIG. 4, in step ST1, connection maker/breaker requests an initial bandwidth allocation. As stated above, this initial request can be performed by sending a bandwidth allocation protocol message. Assuming that the central office has bandwidth available, in step ST2, the bandwidth watcher receives notification that the initial bandwidth has been allocated. This notification can be a bandwidth allocation control protocol message identifying the B channels that can be used by the host. In step ST3, bandwidth watcher 200 monitors a bandwidth demand parameter. In this example, like the first example, the bandwidth demand parameter is the level of data in the send queue.

In step ST4, bandwidth watcher 200 determines whether the bandwidth demand parameter exceeds a first threshold. The first threshold can be a predetermined maximum level of data in the send queue. If the bandwidth demand parameter does not exceed the threshold, bandwidth watcher 200 continues to monitor the parameter. In step ST4, if bandwidth watcher 200 determines that the bandwidth demand parameter exceeds the threshold, bandwidth watcher 200 instructs channel maker/breaker 202 to request at least one additional B channel to the end user (step ST5).

In step ST6, bandwidth watcher 200 receives notification that additional channel(s) have been allocated via the bandwidth allocation control protocol. In step ST7, once the additional B channel or channels have been allocated, bandwidth watcher 200 starts a timer. The value of the timer can be set according to the amount of data waiting in the queue to be sent. For example, if a large amount of data exists in the send queue, bandwidth watcher 200 can set the timer to a value sufficiently large to ensure transmission of all of the data. In step ST8, bandwidth watcher 200 reads the timer value. In step ST9, bandwidth watcher 200 determines whether the timer has expired. If the timer has not expired, bandwidth watcher 200 continues to monitor the timer value. If, in step ST8, the timer has expired, bandwidth watcher 200 instructs connection maker/breaker 202 to release the additional bandwidth. Thus, FIG. 4 illustrates exemplary steps that can be performed on a host for requesting and releasing ISDN bandwidth based on a threshold value and a timer value.

Switch-Side Software

Figure 5:
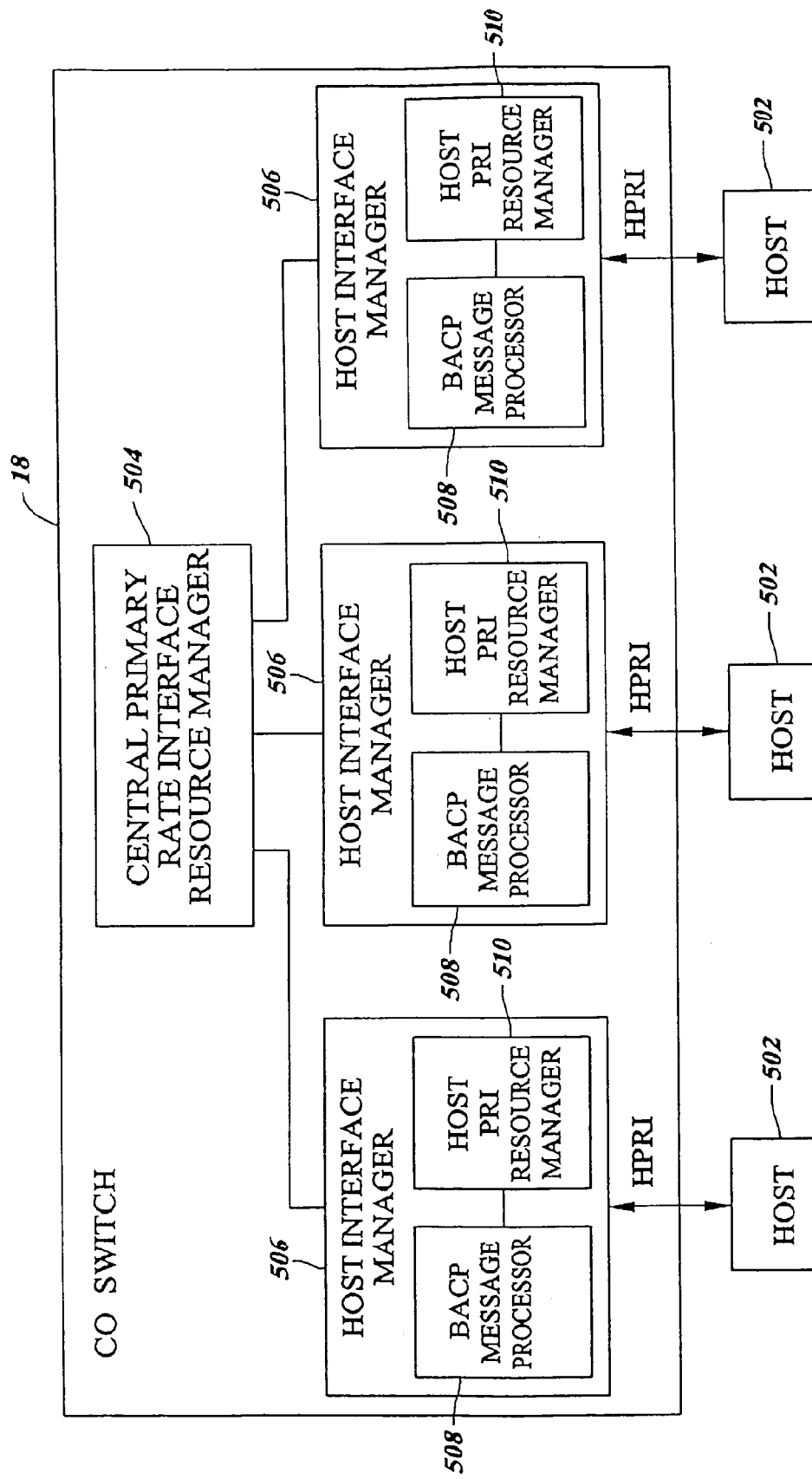
FIG. 5 is a block diagram illustrating exemplary central office side software for providing a hyper primary rate ISDN interface according to an embodiment of the present invention.

FIG. 5 is a block diagram illustrating exemplary switch-side software for dynamically allocating and de-allocating ISDN bearer channels to hosts according to an embodiment of the present invention. In the illustrated embodiment, central office switch 18 dynamically allocates and de-allocates bandwidth to hosts 502. Central office switch 18 can be any type of switch for providing telecommunication service to end users. An example of a central office switch suitable for use with the present invention is the DMS available from Nortel Networks Limited of Research Triangle Park, N.C.

Central office switch 18 includes central primary rate interface resource manager 504 for managing a common pool of primary rate interface resources. Central primary rate interface resource manager 504 monitors the total amount of used primary rate interface bandwidth and the total amount of available primary rate interface bandwidth. Central primary rate interface resource manager 504 may implement call admission control (CAC) for the central office switch to admit or reject extra bandwidth, according to a vendor-specific algorithm. Host interface managers 506 receive bandwidth allocation control protocol messages from hosts 502 and manage primary rate interface bandwidth for each host. Accordingly, each host interface manager includes a bandwidth allocation control protocol (BACP) message processor 508 and a host primary rate interface resource manager 510. The bandwidth allocation control protocol message processor 508 of each host interface manager receives bandwidth allocation control protocol messages from each host and communicates with host primary rate interface resource manager 510 to allocate and de-allocate primary rate interface bandwidth. Each bandwidth allocation control protocol message processor 508 also formulates bandwidth allocation control protocol messages in response to messages received from each host 502. Thus, by communicating with each host using bandwidth allocation control protocol messages, central office switch 18 is capable of dynamically allocating and releasing primary rate interface resources to each host. This system can be contrasted with the conventional central office switch described above where a primary rate interface of 23 bearer channels and one data channel are statically allocated to each host and cannot be changed without hardware and/or software modification to the central office switch.

Figure 6:
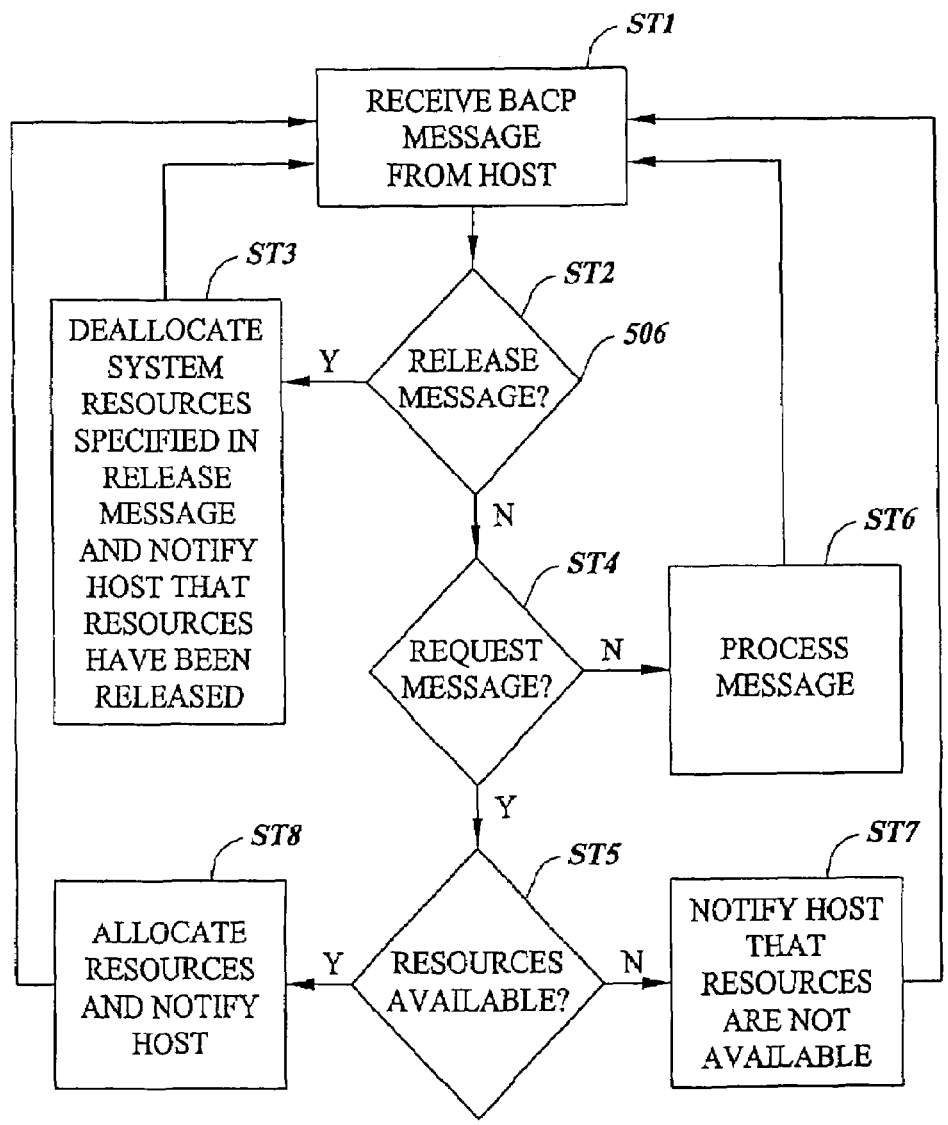
FIG. 6 is a flow chart illustrating the exemplary steps that can be performed by the central office side software in dynamically allocating ISDN bandwidth to a host according to an embodiment of the present invention.

FIG. 6 is a flow chart illustrating exemplary operations that can be performed by host interface managers 506 illustrated in FIG. 5. In step ST1, a host interface manager 506 receives a bandwidth allocation control protocol message from a host. In step ST2, host interface manager 506 determines whether the message is a release message, i.e., a message requesting release of primary rate interface channels. If the message is a release message, in step ST3, host interface manager 506 de-allocates resources specified in the release message and notifies the host that resources have been released.

In step ST4, host interface manager 506 determines whether the message is a request message, i.e., a message requesting primary rate interface bandwidth. If the message is a request message, in step ST5, host interface manager 506 determines whether resources are available to fulfill the request. Determining whether resources are available can include examining resources managed by host interface manager 506. If host interface manager 506 has sufficient resources to allocate the requested bandwidth, host interface manager 506 can respond to the request by allocating resources for the host and notifying the host of the additional bandwidth allocation (step ST6). If resources are not available, host interface manager 506 can notify the host that resources are not available (step ST7) and return to step ST1 to receive the next bandwidth allocation control protocol message.

In step ST4, if the message received from the host is not a release message or a request message, host interface manager 506 processes the message and returns to step ST1. Thus, FIG. 6 illustrates an example of steps that can be performed by a host interface manager in dynamically allocating and releasing primary rate interface bandwidth in response to messages received from a host.

Bandwidth Allocation Control Protocol

Figure 7:
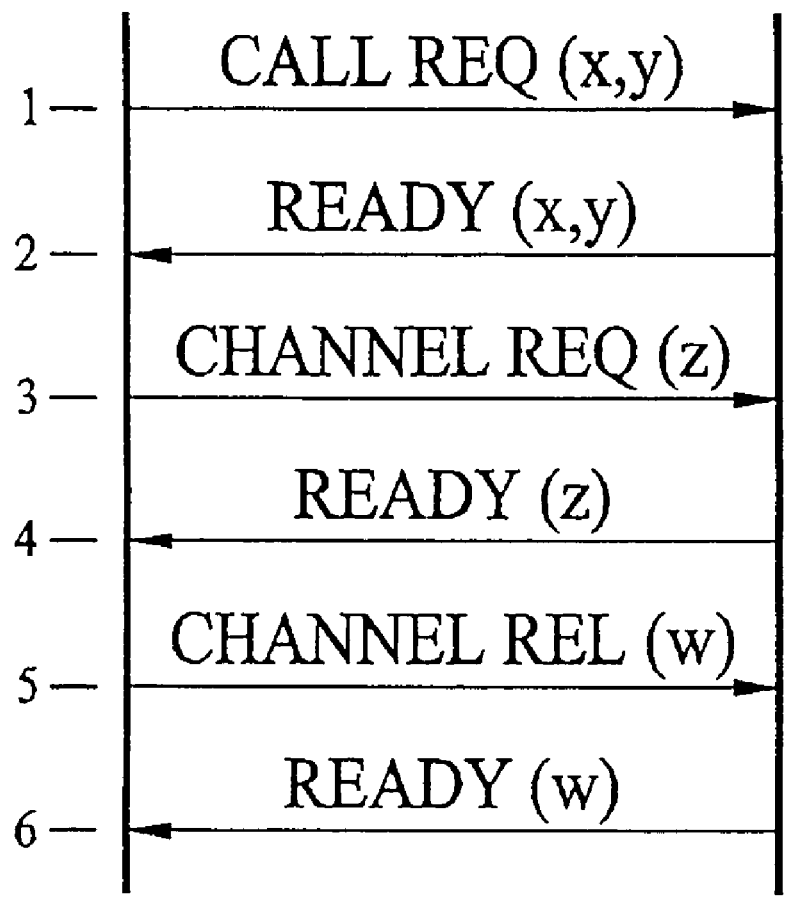
FIG. 7 is a call flow diagram illustrating exemplary bandwidth allocation control protocol messages transmitted between a modem and a central office for dynamically varying the bandwidth of a primary rate ISDN interface according to an embodiment of the present invention.

As stated above, in order to dynamically allocate and de-allocate primary rate interface bandwidth, host devices, such as modems, communicate with a central office switch using bandwidth allocation control protocol messages. FIG. 7 is a call flow diagram illustrating exemplary bandwidth allocation call control messaging that can be exchanged between a modem, such as a DSL modem, and a central office switch for dynamically allocating and de-allocating primary rate interface bandwidth. Referring to FIG. 7, in line 1 of the call flow diagram, in order to obtain an initial bandwidth allocation for a call, DSL modem 14 sends a CALL REQUEST message to central office switch 18. The CALL REQUEST message contains a first parameter x specifying a minimum number of channels and second parameter y specifying a maximum number of channels. For example, the call request message can request an initial allocation of 5 to 8 bearer channels. In line 2 of the call flow diagram, if central office switch 18 determines that resources for allocating the requested number of channels are available, central office switch 18 responds with a READY message. The READY message indicates that central office switch 18 is ready to provide the minimum and maximum number of channels requested in the CALL REQUEST message.

In line 3 of the call flow diagram, DSL modem 14 sends a CHANNEL REQUEST message to central office switch 18. The CHANNEL REQUEST message includes a request for allocation of z additional channels. The CHANNEL REQUEST message can be sent in response to the bandwidth demand parameter exceeding a threshold value. In line 4 of the call flow diagram, central office switch 18 sends a READY message indicating that the bandwidth on z additional channels is ready to be used. Once DSL modem 14 receives the READY message, DSL modem 14 is free to use z additional channels. DSL modem 14 continues to use the z additional channels until the bandwidth demand has decreased, as indicated by a specific level of data in the send queue or the expiration of a timer, as described above.

In line 5 of the call flow diagram when the additional bandwidth is no longer needed, DSL modem 14 sends a CHANNEL RELEASE message to central office switch 18. The CHANNEL RELEASE message identifies the number of channels being released. In response to receiving the channel release message, central office switch 18 frees the system resources corresponding to the de-allocated bearer channels. In line 6 of the call flow diagram, central office switch 18 sends a READY message indicating that the channels have been released. Thus, as illustrated in FIG. 7, the bandwidth allocation control protocol provides exemplary bandwidth allocation control protocol messaging through which bandwidth can be dynamically allocated and de-allocated in response to demand.

It will be understood that various details of the invention can be changed without departing from the scope of the invention. Furthermore, the foregoing description is for the purpose of illustration only, and not for the purpose of limitation—the invention being defined by the claims.

What is claimed is:

1. A method for dynamically varying bandwidth of a primary integrated services digital network (ISDN) interface, the method comprising:
    (a) requesting, over a data (D) channel between an end office and a central office switch, allocation of at least one first bearer (B) channel of a first primary rate ISDN interface;
    (b) receiving, over the D channel, notification of allocation of the at least one first B channel and, in response, sending data over the at least one first B channel;
    (c) monitoring a relationship between a first bandwidth demand parameter and first and second thresholds;
    (d) requesting, over the D channel, allocation of at least one second B channel of the first primary rate ISDN interface in response to a predetermined relationship between the first bandwidth demand parameter and the first threshold;
    (e) receiving, over the D channel, notification of allocation of the at least one second B channel, and, in response, sending data over the at least one second B channel; and
    (f) releasing the at least one second B channel in response to a predetermined relationship between the first bandwidth demand parameter and the second threshold.

2. The method of claim 1 wherein requesting allocation of at least one first B channel includes requesting allocation of one to n B channels, n being an integer equal to the maximum number of B channels provided by a physical interface between the end office and the central office switch.

3. The method of claim 1 wherein the first bandwidth demand parameter includes the amount of data in a send queue and the first threshold includes a first predetermined amount of data in the send queue.

4. The method of claim 3 wherein the second threshold includes a second predetermined amount of data in the send queue.

5. The method of claim 4 wherein the first predetermined amount of data is greater than the second predetermined amount of data.

6. The method of claim 3 wherein the predetermined relationship between the first bandwidth demand parameter and the first threshold includes equality of the first bandwidth demand parameter to the first threshold.

7. The method of claim 3 wherein the predetermined relationship between the first bandwidth demand parameter and the first threshold includes the first bandwidth demand parameter being greater than the first threshold.

8. The method of claim 4 wherein the predetermined relationship between the first bandwidth demand parameter and the second threshold includes equality of the first bandwidth demand parameter to the second threshold.

9. The method of claim 4 wherein the predetermined relationship between the first bandwidth demand parameter and the second threshold includes the first bandwidth demand parameter being less than the second threshold.

10. The method of claim 1 wherein requesting allocation of at least one first B channel includes sending, over the D channel, a bandwidth allocation control protocol message to the central office switch.

11. The method of claim 10 wherein sending a bandwidth allocation control protocol message to the central office switch includes sending, over the D channel, a CALL REQUEST message to the central office switch requesting allocation of a range of B channels from the central office switch.

12. The method of claim 1 wherein requesting allocation of at least one second B channel includes sending, over the D channel, a bandwidth allocation control protocol message to the central office switch.

13. The method of claim 12 wherein sending a bandwidth allocation control protocol message to the central office switch includes sending, over the D channel, a CHANNEL REQUEST message for requesting allocation of a specified number of B channels from the central office switch.

14. The method of claim 1 wherein releasing the at least one second B channel includes sending, over the D channel a bandwidth allocation control protocol message to the central office switch.

15. The method of claim 14 wherein sending a bandwidth allocation control protocol message to the central office switch includes sending, over the D channel, a CHANNEL RELEASE message to the central office switch for requesting release of the at least one second B channel.

16. A method for dynamically varying bandwidth of a primary rate integrated services digital network (ISDN) interface, the method comprising:
    (a) requesting, over a data (D) channel between an end office and a central office switch, allocation of at least one first bearer (B) channel of a first primary rate ISDN interface;
    (b) receiving, over the D channel, notification of allocation of the at least one first B channel and, in response, transmitting data over the at least one first B channel;
    (c) monitoring a relationship between a first bandwidth demand parameter and first threshold;
    (d) requesting, over the D channel, at least one second B channel of the first primary rate ISDN interface in response to a predetermined relationship between the first bandwidth demand parameter and the first threshold;
    (e) receiving, over the D channel notification of allocation of the at least one second B channel, and, in response, transmitting data over the at least one second B channel and starting a timer; and
    (f) releasing the at least one second B channel in response to the timer reaching a predetermined value.

17. The method of claim 16 wherein requesting allocation of at least one first B channel includes requesting allocation of one to n B channels, n being an integer equal to the maximum number of B channels provided by a physical interface between the end office and the central office switch.

18. The method of claim 16 wherein the first bandwidth demand parameter is an amount of data in a send queue.

19. The method of claim 16 wherein the predetermined relationship between the first bandwidth demand parameter and the first threshold includes equality of the first bandwidth demand parameter to the first threshold.

20. The method of claim 16 wherein the predetermined relationship between the first bandwidth demand parameter and the first threshold includes the first bandwidth demand parameter being greater than the first threshold.

21. The method of claim 16 wherein requesting at least one first B channel includes sending, over the D channel, a bandwidth allocation control protocol message to the central office switch.

22. The method of claim 21 wherein sending a bandwidth allocation control protocol message to the central office switch includes sending, over the D channel, a CALL REQUEST message to the central office switch requesting allocation of a range of B channels from the central office switch.

23. The method of claim 16 wherein requesting allocation of at least one second B channel includes sending, over the D channel, a bandwidth allocation control protocol message to the central office switch.

24. The method of claim 23 wherein sending a bandwidth allocation control protocol message to the central office switch includes sending, over the D channel, a CHANNEL REQUEST message for requesting allocation of a specified number of B channels from the central office switch.

25. The method of claim 16 wherein releasing the at least one second B channel includes sending, over the D channel, a bandwidth allocation control protocol message to the central office switch.

26. The method of claim 25 wherein sending a bandwidth allocation control protocol message to the central office switch includes sending, over the D channel, a CHANNEL RELEASE message to the central office switch for requesting release of the at least one second B channel.

27. A system for dynamically varying bandwidth of a primary rate integrated services digital network (ISDN) interface, the system comprising:
  (a) a bandwidth watcher associated with a first network element for determining whether a first predetermined relationship exists between a first bandwidth demand parameter and a first threshold; and
  (b) a connection maker/breaker for communicating with the bandwidth watcher and for requesting, over a data (D) channel, allocation of at least one bearer (B) channel of a first primary rate ISDN interface from a central office switch in response to receiving notification from the bandwidth watcher that the first predetermined relationship exists between the bandwidth demand parameter and the first threshold;
  wherein the bandwidth watcher is adapted to determine whether a second predetermined relationship exists between the first bandwidth demand parameter and a second threshold lower than the first threshold.

28. The system of claim 27 wherein the connection maker/breaker is adapted to request allocation of one to n B channels, n being an integer equal to the maximum number of B channels provided by a physical interface between an end office and a central office switch.

29. The system of claim 27 wherein the first bandwidth demand parameter includes a first amount of data in a send queue associated with the first network element and the first threshold includes a first predetermined level of data in the send queue.

30. The system of claim 27 wherein the connection maker/breaker is adapted to send, over the D channel, a bandwidth allocation control protocol message to the central office switch for requesting allocation of the at least one B channel.

31. The system of claim 27 wherein, in response to determining that the second predetermined relationship exists between the first bandwidth demand parameter and the second threshold, the bandwidth watcher is adapted to instruct the connection maker/breaker to release the at least one B channel provided by the central office switch.

32. The system of claim 27 wherein, in response to receiving notification that the second predetermined relationship exists, the connection maker/breaker is adapted to send, over the D channel, a bandwidth allocation control protocol message to the central office switch for requesting de-allocation of the at least one B channel.

33. A computer program product comprising computer executable instructions embodied in a computer readable medium for performing steps comprising:
  (a) determining whether a first predetermined relationship exists between a first bandwidth demand parameter associated with a first network element and a first threshold;
  (b) requesting, over a data (D) channel, allocation of at least one bearer (B) channel of a first primary rate integrated services digital network (ISDN) interface from a central office switch in response to determining that the first predetermined relationship exists; and
  (c) determining whether a second predetermined relationship exists between the first bandwidth demand parameter and a second threshold lower than the first threshold.

34. The computer program product of claim 33 wherein requesting allocation of at least one B channel includes requesting allocation of one to n B channels, n being an integer equal to a maximum number of B channels provided by a physical interface between the central office switch and an end office.

35. The computer program product of claim 33 comprising, in response to receiving notification of allocation of the at least one first B channel, sending data to the central office switch over the at least one first B channel.

36. The computer program product of claim 33 comprising, in response to determining that the second predetermined relationship exists, releasing the at least one B channel.

37. The computer program product of claim 36 wherein releasing the at least one B channel includes sending, over the D channel, a bandwidth allocation control protocol message to the central office switch for requesting de-allocation of the at least one B channel.

* * * * *